US007676484B2

(12) United States Patent
Fagin

(10) Patent No.: US 7,676,484 B2
(45) Date of Patent: Mar. 9, 2010

(54) SYSTEM AND METHOD OF PERFORMING AN INVERSE SCHEMA MAPPING

(75) Inventor: Ronald Fagin, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 11/428,387

(22) Filed: Jul. 30, 2006

(65) Prior Publication Data

US 2008/0228799 A1 Sep. 18, 2008

(51) Int. Cl.
*G06F 17/30* (2006.01)
(52) U.S. Cl. .................... 707/101; 707/10; 707/100
(58) Field of Classification Search .................. None
See application file for complete search history.

(56) References Cited

U.S. PATENT DOCUMENTS

| | | | |
|---|---|---|---|
| 6,704,744 B1 | 3/2004 | Williamson et al. | |
| 6,718,320 B1 | 4/2004 | Subramanian et al. | |
| 6,826,568 B2 | 11/2004 | Bernstein et al. | |
| 7,010,539 B1 | 3/2006 | Haas et al. | |
| 7,149,746 B2 * | 12/2006 | Fagin et al. | 707/102 |
| 7,401,131 B2 * | 7/2008 | Robertson et al. | 709/220 |
| 2003/0217069 A1 * | 11/2003 | Fagin et al. | 707/102 |
| 2004/0111410 A1 * | 6/2004 | Burgoon et al. | 707/4 |
| 2004/0261029 A1 * | 12/2004 | Skjaervik | 715/734 |
| 2006/0101073 A1 * | 5/2006 | Popa et al. | 707/104.1 |
| 2007/0027900 A1 * | 2/2007 | Toyoda et al. | 707/102 |
| 2007/0143327 A1 * | 6/2007 | Rivas et al. | 707/101 |
| 2007/0220022 A1 * | 9/2007 | Lankinen et al. | 707/101 |

OTHER PUBLICATIONS

Fagin et al, "Data Exchange Semantics and Query Answering*", Jan. 8, 2003, International Conference on Database Theory 2003, p. 1-37, <Retrieved from the internet Feb. 17, 2009>.*
McBrien et al, "Data Integration by Bi-Directional Schema Transformation Rules", Mar. 2003, Proceedings of the 19th Intl. Conf. on Data Engineering, IEEE Computer Society, p. 227-238, <Retrieved from IEEE Explore Feb. 17, 2009>.*
Gottlob et al, "Monadic Datalog and the Expressive Power of Languages for Web Information Extraction", Jan. 2004, Journal of the ACM, ACM Press, p. 74-113, <Retrieved from internet Feb. 16, 2009>.*
Deng et al, "Managing the Evolution of Simple and Complex Mappings between Loosely-Coupled Systems", Feb. 2004, Hewlett-Packard Laboratories Technical Report 2004-68, p. 1-27, <Retrieved from internet Feb. 16, 2009>.*

(Continued)

*Primary Examiner*—Khanh B Pham
(74) *Attorney, Agent, or Firm*—Samuel A. Kassatly; Shimokaji & Associates, P.C.

(57) ABSTRACT

Given a target schema in which instances have been mapped from a source schema, an inverse schema mapping system generates an instance of a target relation for each of a plurality of target relations in the target schema, chases the target relation using a schema mapping to generate a plurality of target relations for the source schema, and then generates an inverse schema mapping, if one exists, that maps the instances of the target schema to the instances of the source schema.

15 Claims, 3 Drawing Sheets

OTHER PUBLICATIONS

Deutsch et al, "Determining Source Contribution in Integration Systems", Jun. 2005, PODS'05, ACM Press, p. 304-315, <Retrieved from ACM Portal Feb. 16, 2009>.*

Fagin et al, "Data Exchange: Getting to the Core", Mar. 2005, ACM TODS, vol. 30, No. 1, p. 174-210, <Retrieved from ACM Portal Feb. 16, 2009>.*

Ehrig, "Ontology Alignment Bridging the Semantic Gap", Dec. 7, 2005, Dissertation, p. v-xv, 1-251, <Retrieved from internet Feb. 17, 2009>.*

Fagin, "Inverting Schema Mappings", Jun. 2006, PODS'05, 23 pages, <Retrieved from ACM Portal Feb. 16, 2009>.*

Fuxman et al, "Nested Mappings Schema Mapping Reloaded", Sep. 2006, VLDB 2006, p. 67-78, <Retrieved from internet Feb. 16, 2009>.*

Gottlob et al, "Data Exchange Computing Cores in Polynomial Time", Jun. 2006, PODS'06, ACM Press, p. 40-49, <Retrieved from ACM Press Feb. 16, 2009>.*

Steffan et al, "Boolean Algebra of Shape Analysis Constraints", Jan. 2004, Proceedings of the 5th International Conference on Verification, Model Checking and Abstract Interpretation, p. 63, <Retrieved from Google Books Mar. 14, 2009>.*

R. Fagin, et al., "Composing Schema Mappings: Second-Order Dependencies to the Rescue," ACM Transactions on Database Systems, vol., No. 20, pp. 1-60.

R. Fagin, et al., "Data exchange: semantics and query answering," Theoretical Computer Science, 336 (2005), pp. 89-124.

S. Melnik, et al., "Supporting Executable Mappings in Model Management," SIGMOD Jun. 14-16, 2005,.

A. Nash, et al., "Composition of Mappings Given by Embedded Dependencies," PODS Jun. 13-15, 2005.

P. Bohannon, et al., "Information Preserving XML Schema Embedding, "Proceedings of the 31st VLDB Conference, Trondheim, Norway, 2005, pp. 85-96.

Ronald Fagin, Inverting Schema Mappings, PODS '06, Jun. 26-28, 2006, Chicago, Illinois, USA.

* cited by examiner

US 7,676,484 B2

SYSTEM AND METHOD OF PERFORMING AN INVERSE SCHEMA MAPPING

FIELD OF THE INVENTION

The present invention generally relates to schema mapping, and in particular, to a method for inverse schema mappings in which a schema MAPPING between a source schema and a target schema is "undone", reverting to the materialization of an instance in the target schema to a corresponding instance in the source schema.

BACKGROUND OF THE INVENTION

Many modern applications such as data warehousing, global information systems, and electronic commerce require accessing a data source that stores data arranged in a source schema, and then using that data at a target that requires the data to be arranged in a target data schema. For example, product data that is stored in one schema for optimal storage efficiency may have to be accessed and reformatted into another schema for Web commerce.

Data exchange is the problem of materializing an instance that adheres to a target schema, given an instance of a source schema and a schema mapping that specifies the relationship between the source and the target. A schema mapping is a specification that describes how data structured under one schema (a source schema) is to be transformed into data structured under a different schema (the target schema). Schema mappings are ubiquitous in information integration systems.

The application of schema mapping arises often when data is transferred between independent applications that do not have the same data format. Conventional approaches exist for mapping data from a source schema to a target schema. Because of the extensive use of schema mappings, it has become important to develop a framework for managing schema mappings and other metadata.

Although conventional schema mapping frameworks have proven to be useful, it would be desirable to present additional improvements. Conventional frameworks lack an inverse operator; i.e., an inverse schema mapping. Developing an inverse schema mapping is not straightforward. A schema mapping is not simply a function that maps an instance of a source schema to an instance of a target schema. Rather, for each source instance, the schema mapping may associate many target instances. Furthermore, for each target instance, there may be many corresponding source instances.

Having mapped data from a source schema to a target schema, in many applications an inverse mapping is useful. For example, data may be migrated from one application (a source application) to another application (a target application) using schema mapping. The user may decide to slop using the target application if, for example, the developer stops supporting the target application, the user determines the target application is not providing desired functionality, etc. In this example, an inverse mapping is useful for rolling back data to the source application. An inverse schema mapping can accomplish this data "roll back". A user may further decide in the process of mapping a source schema to a target schema to "roll back" one step of the schema transformation. No method currently exists for generating an inverse schema mapping.

What is therefore needed is a system, a computer program product, and an associated method for performing an inverse schema mapping. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for performing an inverse schema mapping, if one exists.

Given a target schema in which instances have been mapped from a source schema, the present system generates an instance of a target relation for each of a plurality of target relations in the target schema, chases the target relation using a schema mapping to generate a plurality of source relations for the source schema. The system further generates an inverse schema mapping that maps instances of the target schema to the instances of the source schema.

The present system may be embodied in a utility program such as an inverse schema mapping utility program. The present system also provides a method for the user to identify a target schema and a source schema; instances of the source schema have previously been materialized from the target schema by schema mapping. The present system provides a method for the user to invoke the inverse schema mapping utility to generate an inverse schema mapping from the source schema to the target schema, if one exists.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
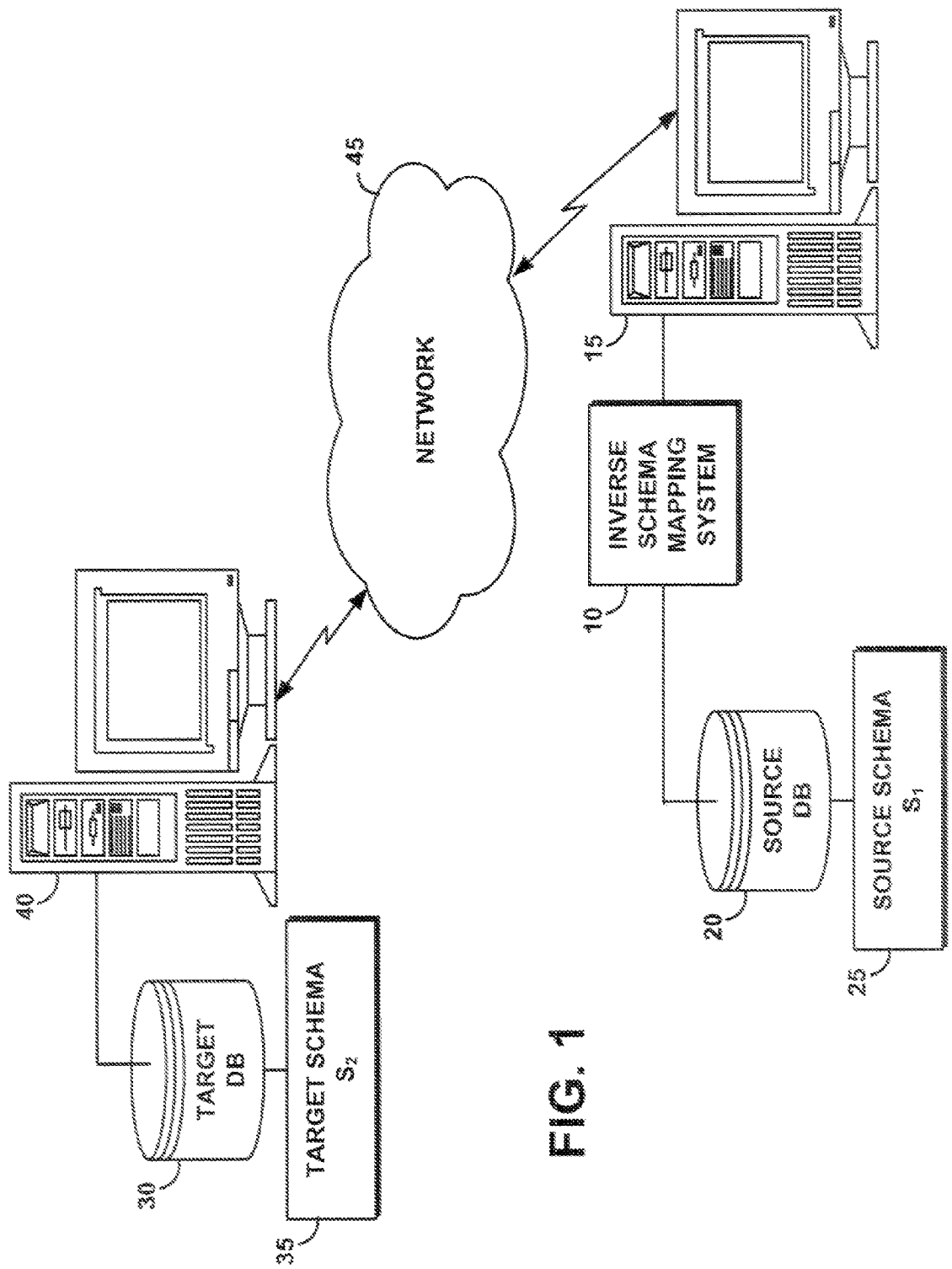
FIG. 1 is a schematic illustration of an exemplary operating environment in which an inverse schema mapping system of the present invention can be used.

FIG. 1 portrays an exemplary overall environment in which a system, a service, a computer program product, and an associated method (the "system 10") for performing an inverse schema mapping according to the present invention may be used. System 10 comprises a software programming code or a computer program product that is typically embedded within, or installed on a computer 15. Alternatively, system 10 can be saved on a suitable storage medium such as a diskette, a CD, a hard drive, or like devices.

System 10 can fake the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device, The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A source database 20 comprises a source schema 25, further referenced herein as $S_1$ 25. A target database 30 comprising a target schema 35 (further referenced herein as $S_2$ 35) resides on a computer 40. The target schema 35 comprises instances materialized from a schema mapping applied to the source schema 25.

Computer 15 and computer 40 may communicate via a network 45. While system 10 is described in terms of network 45, computer 15 and computer 40 may also communicate locally rather than remotely. System 10 is described in terms of a database application for exemplary purposes only; system 10 may be used to generate an inverse schema mapping for any type of schema. Furthermore, the target database 30 and the target schema 35 may reside on computer 15 with the source database 20 and the source schema 25.

Given target schema 35, source schema 25, and a schema mapping, system 10 performs an inverse schema mapping to map instances of the target schema 35 back to the format of the source schema 25, "undoing" the original schema mapping.

A schema is a finite sequence $R=\langle R_1, \ldots, R_k\rangle$ of distinct relation symbols, each of a fixed arity. An instance of I (over the schema R) is a sequence $\langle R_1^I, \ldots, R_k^I\rangle$ such that each $R_1^I$ is a finite relation of the same arity as $R_1$. The term $R_1^I$ is referenced as the $R_1$ relation of I.

If $s_1$ is a schema (the source schema 25) and $s_2$ is a schema (the target schema 35), a source-to-target tuple-generating dependency is a formula of the form:

$$\phi(x) \to \exists y \phi(x,y) \quad (1)$$

where $\phi(x)$ is a conjunction of atomic formulas over $s_1$ and $\phi(x,y)$ is a conjunction of formulas over $s_2$. As an example, if $s_1$ contains the relation symbols R and S, and $s_2$ contains the relational symbol T, then $$(R(x_1,x_1) \wedge S(x_1,x_2)) \to \exists y (T(x_1,y) \wedge T(y,x_2)) \quad (2)$$

is a source-to-target tuple-generating dependency.

A schema mapping is a triple $(s_1,s_2,\Sigma_{12})$, where $s_1$ is the source schema, $s_2$ is the target schema, and $\Sigma_{12}$ is a finite set of source-to-target tuple-generating dependencies.

If $M_{12}$ is a schema mapping with source schema $s_1$ and target schema $s_2$, an inverse mapping with the target schema $s_2$ as source schema and the source schema $s_1$ as target schema "undoes" the effect of the schema mapping $M_{12}$. If S is a class of source instances, then an S-inverse is a schema mapping that "works" as an inverse when applied to source instances in the class S. If S is the class of all source instances, then an S-inverse is called a global inverse, an inverse without any restriction on source instances.

A chase is a conventional procedure that generates tuples that are "forced" by a source-to-target tuple-generating dependency. For example, assume that mapping $\Sigma_{12}$ contains, among other source-to-target tuple-generating dependencies, the source-to-target tuple-generating dependency of equation (2). Furthermore, I is a source instance, the R relation of I contains (among other tuples) the tuple $(a_1, a_1)$, and the S relation of I contains (among other tuples) the tuple $(a_1, a_2)$. The chase of I with mapping $\Sigma_{12}$, denoted chase$_{12}$(I), is a target instance J where the T relation of J contains tuples $(a_1, y)$ and $(y, a_2)$, in this context the variable y is a "null value", meaning that y stands for some unknown value.

Figure 2:
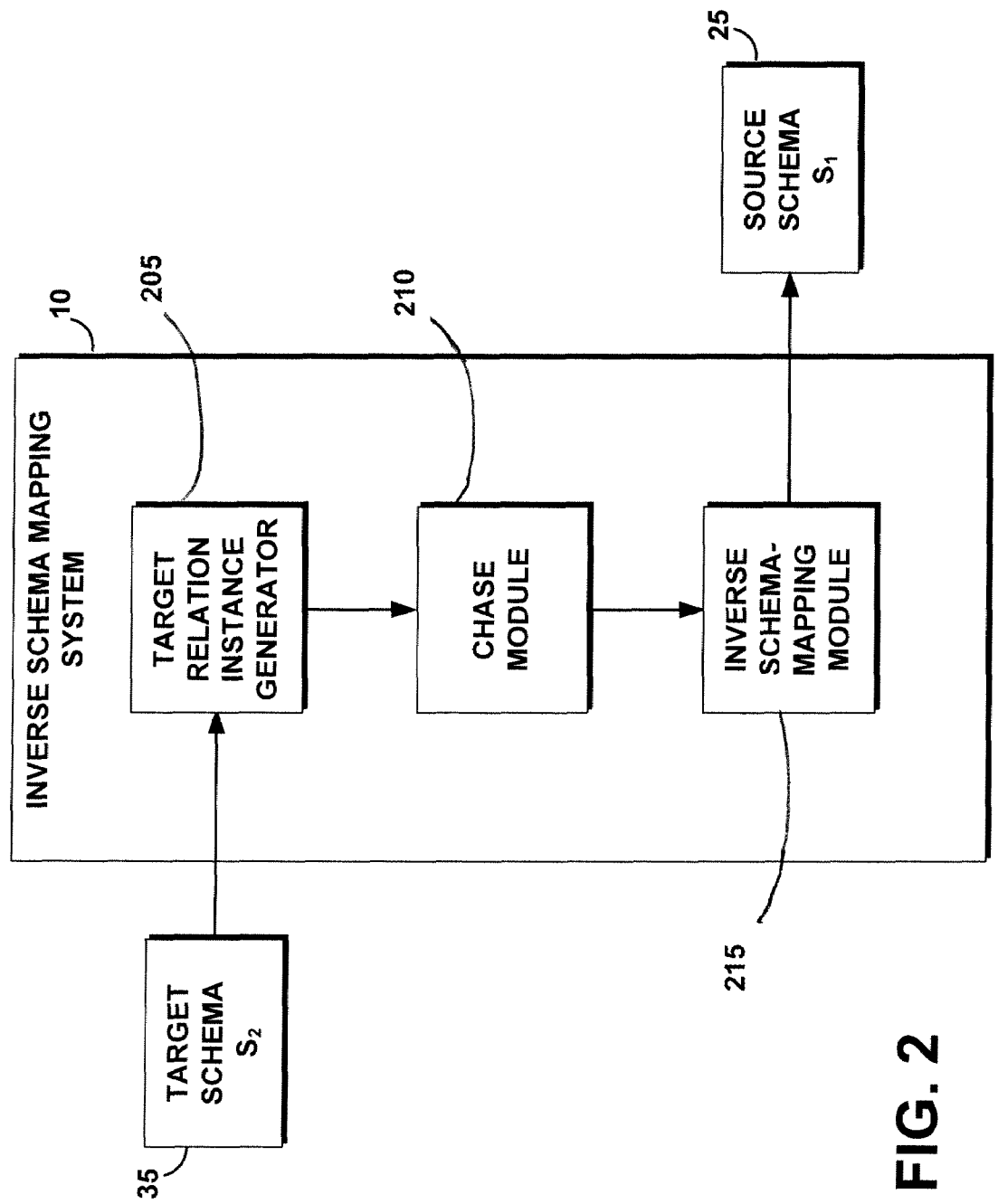
FIG. 2 is a block diagram of the high-level architecture of the inverse schema mapping system of FIG. 1.

FIG. 2 illustrates a high-level hierarchy of system 10. System 10 comprises a target relation instance generator 205, a chase module 210, and an inverse schema-mapping module 215.

Figure 3:
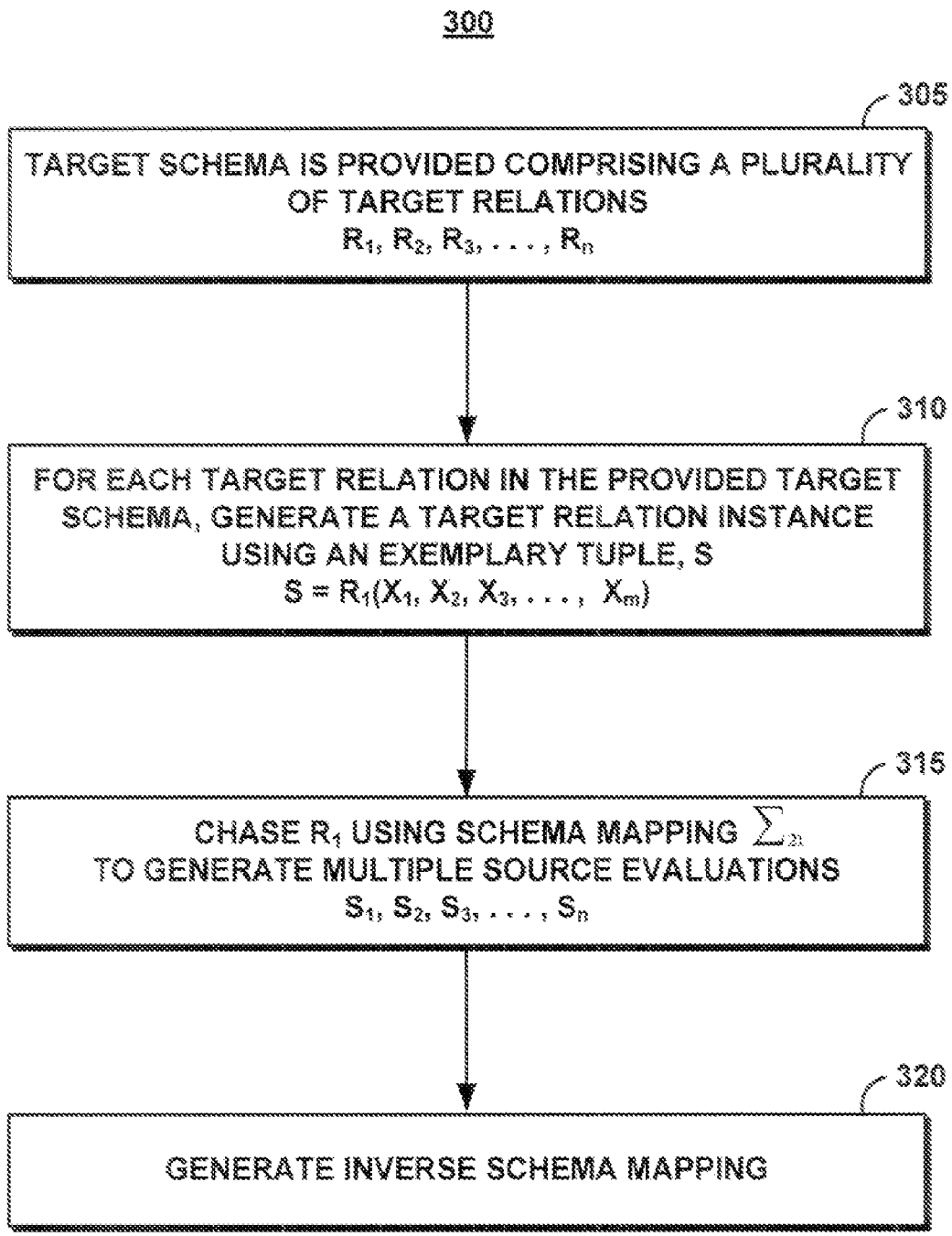
FIG. 3 is a process flow chart illustrating a method of operation of the inverse schema mapping system of FIGS. 1 and 2.

FIG. 3 illustrates a method 300 of system 10 in generating an inverse schema mapping from a source schema such as source schema 25 to a target schema such as target schema 35. Assume that $M_{12}=(S_1,S_2,\Sigma_{12})$ is a schema mapping and that $M_{12}$ has a global inverse. The target schema 35 is the source schema for the inverse mapping of system 10; system 10 has a target of generating instances in the source schema 25 from the target schema 35. The target schema 35 is provided in which the target schema comprises a plurality of target relations such as $R_1, R_2, R_3, \ldots, R_n$ (step 305). For each target relational symbol R, let $I_R$ be the target instance comprising $R(x_1, \ldots, x_k)$, if R is k-ary. For each target relation in the provided target schema, the target relation instance generator 205 generates a source relation instance using exemplary tuples; i.e., $R_1(x_1, \ldots, x_m)$ (step 310).

Let $\delta_R$ be the target-to-source tuple-generating tendency whose left-hand side is the conjunction of the members of chase$_{12}(I_R)$ and whose right-hand side is $R(x_1, \ldots, x_k)$. The chase module 210 chases each of the source relations of the provided target schema, i.e., $R_1(x_1, \ldots, x_m)$ (step 315).

Let $\Sigma_{21}$ comprise the target-to-source tuple-generating tendencies, the $\delta_R$'s. The inverse schema-generating module 215 generates an inverse schema mapping (step 320) using $\Sigma_{21}$.

For example, the target schema 35 may comprise a relation with one tuple: $R_1(x_1, x_2, x_3)$, given in step 305. The chase module chases $R_1$ using $\Sigma_{21}$, producing a target relation such as, for example, $S_1(x_1, y, x_3, x_2)$ and $S_1(y, x_4, x_2, x_2)$. The target relation may also have a binary relation, for example, $S_2(x_1, x_1)$ and $S_2(x_3, x_4)$. System 10 generates an inverse schema mapping for this example as:

$$S_1(x_1,y,x_1,x_2) \wedge S_1(y,x_4,x_2,x_2) \wedge S_2(x_1,x_1) \wedge S_2(x_3,x_4) \to R_1(x_1,x_2,x_3)$$

Assume now that S is a class of source instances defined by a set $\Gamma$ of dependencies with a finite chase. Dependencies are sentences similar to target-to-source tuple-generating tendencies, except that these dependencies refer only to source instances and these dependencies may have an equality on the right-hand side. Further, $M_{12}=(S_1,S_2,\Sigma_{12})$ is a schema mapping and $M_{12}$ has an S-inverse. For each source relational symbol R, let $I_R$ be as before, and let $I'_R$ be the result of chasing $I_R$ with $\Gamma$. Let $\delta'_R$ be the target-to-source tuple-generating dependency whose left-hand side is the conjunction of the members of $chase_{12}(I'_{12})$ and whose right-hand side is $R(x_1, \ldots, x_k)$. Let $\Sigma'_{12}$ comprise the $\delta_R$'s. Therefore, $M_{21}=(S_1,S_2,\Sigma'_{12})$ is an S-inverse of $M_{12}$.

It is to be understood that the specific embodiments of the invention that have been described are merely Illustrative of certain applications of the principle of the present invention. Numerous modifications may be made to the system and method for performing an inverse schema mapping described herein without departing from the spirit and scope of the present invention.

What is claimed is:

1. A processor-implemented method of inversing a schema mapping in a computer, comprising:
    identify in a source schema comprising a finite sequence of distinct relation symbols having a plurality of source relations, wherein each of the distinct relation symbols of the source schema has a fixed arity;
    for each source relation, creating a source relation instance for each of the distinct relation symbols, resulting in a plurality of source relation instances comprising an instance sequence of the distinct relation symbols with the fixed arity of the source schema;
    chasing each source relation instance using the schema mapping to generate a plurality of target relations in a target schema; and
    generating an inverse schema mapping in the computer by mapping the plurality of target relations from the target schema to the source relation instances of the source schema.

2. The method of claim 1, wherein the schema mapping includes a finite set of a source-to-target tuple-generating dependency.

3. The method of claim 2, wherein the source-to-target tuple-generating dependency is based on a conjunction of atomic formulas over the source schema, and a conjunction of other formulas over the target schema.

4. The method of claim 1, wherein the target schema includes a finite sequence of distinct relation symbols.

5. The method of claim 4, wherein each of the distinct relation symbols of the target schema has a fixed arity.

6. A processor-implemented system of inversing a schema mapping in a computer, comprising:
    a computer with a computer processor for processing inversed schema mapping;
    a target relation instance generator for identifying a source schema comprising a finite sequence of distinct relation symbols having a plurality of source relations, wherein each of the distinct relation symbols of the source schema has a fixed arity;
    for each source relation, the target relation instance generator creating a source relation instance using the distinct relation symbols, resulting in a plurality of source relation instances comprising an instance sequence of the distinct relation symbols with the fixed arity of the source schema;
    a chase module for chasing each source relation instance using the schema mapping to generate a plurality of target relations in a target schema using a target-to-source tuple-generating dependency for each target relation; and
    an inverse schema-mapping module for generating an inverse schema mapping in a computer by mapping the plurality of target relations from the target schema to the source relation instances of the source schema.

7. The system of claim 6, wherein the schema mapping includes a finite set of a source-to-target tuple-generating dependency.

8. The system of claim 7, wherein the source-to-target tuple-generating dependency is based on a conjunction of atomic formulas over the source schema, and a conjunction of other formulas over the target schema.

9. The system of claim 6, wherein the target schema includes a finite sequence of distinct relation symbols.

10. The system of claim 9, wherein each of the distinct relation symbols of the target schema has a fixed arity.

11. A computer program product having program codes stored on a computer readable storage medium for inversing a schema mapping, comprising:
    a computer readable storage medium having computer readable program code embodied therewith, the computer readable program code comprising:
    a set of instruction codes for identifying a source schema in a source database of a computer, wherein the source schema comprises a finite sequence of distinct relation symbols having a plurality of source relations, wherein each of the distinct relation symbols of the source schema has a fixed arity;
    for each source relation, a set of instruction codes creating a source relation instance for each of the distinct relation symbols, resulting in a plurality of source relation instances comprising an instance sequence of the distinct relation symbols with the fixed arity of the source schema;
    a set of instruction codes for chasing each source relation instance using the schema mapping to generate a plurality of target relations in a target schema format that is different than the source schema format; and
    a set of instruction codes generating an inverse schema mapping by mapping the plurality of target relations from the target schema to the source relation instances of the source schema returning the source relation instances back to the source schema format in the source database.

12. The computer program product of claim 11, wherein the schema mapping includes a finite set of a source-to-target tuple-generating dependency.

13. The computer program product of claim 12, wherein the source-to-target tuple-generating dependency is based on a conjunction of atomic formulas over the source schema, and a conjunction of other formulas over the target schema.

14. The computer program product of claim 12, wherein the source schema includes a finite sequence of distinct relation symbols.

15. The computer program product of claim 12, wherein the target schema includes a finite sequence of distinct relation symbols; and
    wherein each of the distinct relation symbols of the target schema has a fixed arity.

* * * * *